UNITED STATES PATENT OFFICE.

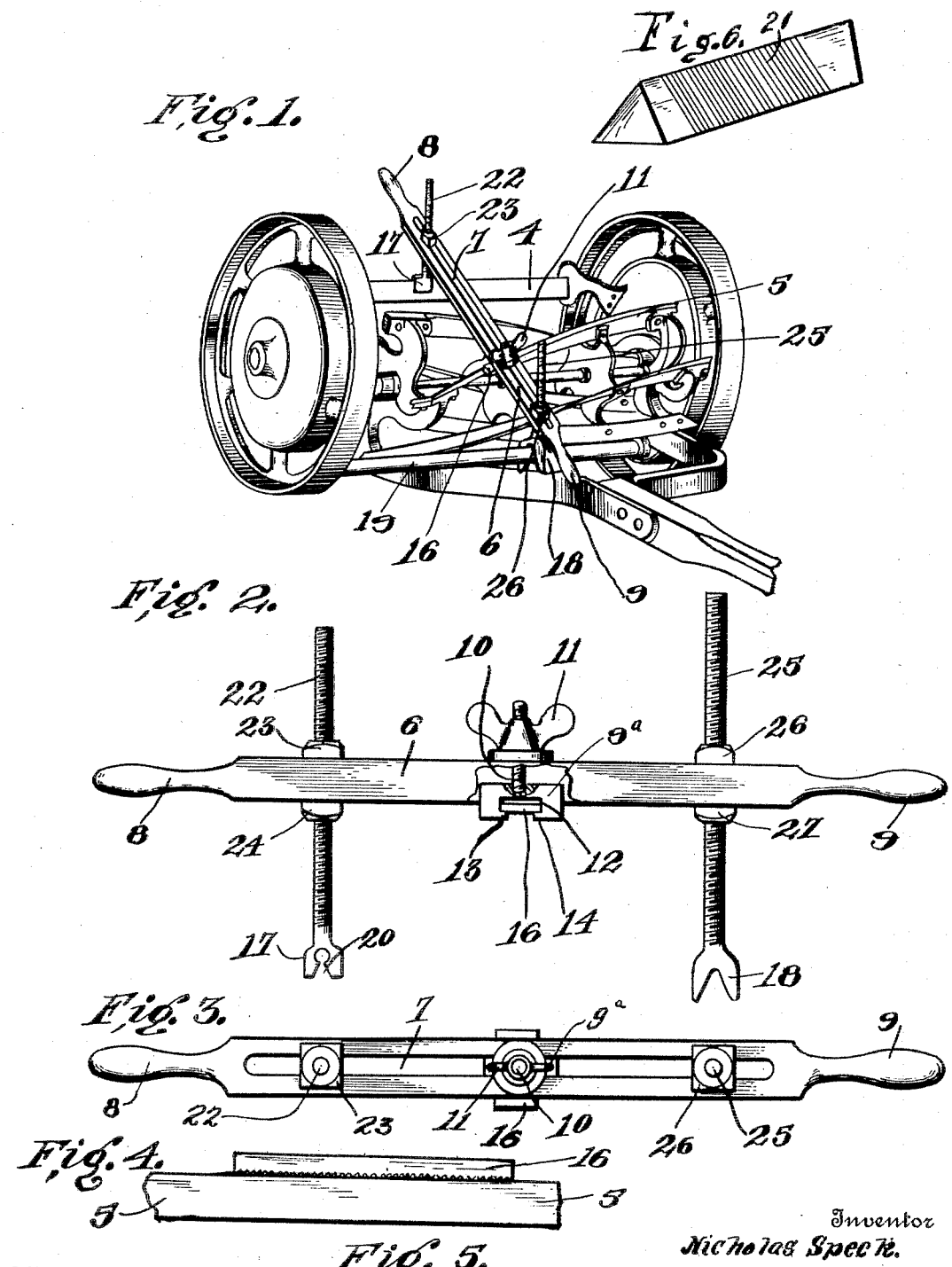

NICHOLAS SPECK, OF MONROE, WISCONSIN, ASSIGNOR OF ONE-THIRD TO HENRY JOHANNET AND ONE-THIRD TO JAMES O. FIDLER, OF MONROE, WISCONSIN.

SHARPENER FOR LAWN-MOWERS.

1,076,919.    Specification of Letters Patent.    Patented Oct. 28, 1913.

Application filed June 20, 1912. Serial No. 704,872.

*To all whom it may concern:*

Be it known that I, NICHOLAS SPECK, a citizen of the United States of America, and resident of Monroe, in the county of Green and State of Wisconsin, have invented certain new and useful Improvements in Sharpeners for Lawn-Mowers, of which the following in a specification.

This invention relates to sharpeners for lawn mowers and has for its object the provision of novel means for guiding the sharpening device with relation to the blades of a lawn mower, means being provided for permitting the adjustment of the parts in order that the said sharpener may be regulated to operate in conjunction with lawn mowers of different proportions or types.

A still further object of this invention is to provide novel means for clamping the sharpening tool and for adjusting the guiding means with relation thereto for the purpose indicated, means being also provided for sharpening the stationary knife of a lawn mower simultaneously with the sharpening of the cutter blades thereof.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a perspective view of a portion of a lawn mower showing the application of the invention to the blades thereof; Fig. 2 illustrates a view in elevation of the sharpening device; Fig. 3 illustrates a top plan view thereof; Fig. 4 illustrates a side elevation of a fragment of a blade with the file applied thereto; and Fig. 5 illustrates a face view of the file. Fig. 6 illustrates a perspective view of a three cornered file to be used in combination with my invention.

In these drawings 4 denotes a stationary knife of a lawn mower in conjunction with which the rotary blades 5 are adapted to operate the said blades 5 being mounted on rotatable carriers of any appropriate type.

As blades of lawn mowers are usually of curved formation, I have illustrated the blades of the lawn mower to which the sharpening device is applied as extending spirally about the axis upon which they are mounted and will describe the sharpening device and the operation thereof by referring to the illustration of the lawn mower.

The sharpening device comprises a body 6 provided with a longitudinally disposed slot 7, said body having handles 8 and 9 at the ends thereof. A clamp is adjustable longitudinally of the slot and comprises a block 9ª which is approximately the width of the slot 7 and is slidable therein, the said block having an integral shank 10 extending above the upper surface of the body and screw threaded to receive the wing nut 11, the rotation of which on the threaded shank serves to draw the block or body 9ª upwardly into the slot or permits it to descend therein according to the rotation of the said wing nut.

As shown in the drawing, the block 9ª is provided with a transversely disposed recess 12 forming shoulders 13 and 14 on which a file 15 or other sharpening tool may be placed, the said body 9ª having an opening in its under surface through which the sharpening tool is interposed and into which the blade of the lawn mower to be sharpened may extend. It will be understood from an inspection of the drawing that by unscrewing the wing nut 11, the block may be allowed to descend in the slot thereby releasing the sharpening tool whereas a reverse movement of the wing nut will result in elevating the shoulders 13 and 14 carrying the sharpening tool 16 against the under surface of the body and serving to bind the said sharpening tool in position so that it cannot be moved from its seat. The body 6 is provided with guides 17 and 18, the former of which is intended to ride on the stationary knife of a lawn mower and the latter of which is intended to ride on a cross rod 19 which is universally employed in the construction of lawn mowers. The guide 17 is shown as having a circular socket 20 which may contain a three-cornered file 21 for the purpose of sharpening the knife 4 of a lawn mower but when the knife 4 is not to be sharpened, the guide 17 may be caused to slide thereon for the purpose of guiding the sharpening device intended to operate on the blades 5.

The guide 17 has a threaded shank 22 which extends through the slot 7 of the body, the said threaded shank having nuts 23 and 24 binding against the upper and lower surfaces respectively of the body and by reason of the presence of the nuts on the threaded shank, the said shank may be adjusted longitudinally of the body for the purpose of bringing the guide 17 into proper operative relation to the knife of the lawn mower. Likewise, the guide 18 is provided with a threaded shank 25 having nuts 26 and 27 for binding against the upper and lower surface respectively of the body in order that the guide 18 may be adjusted to different positions to accommodate itself to lawn mowers of different sizes. As the block 9ª and the sharpening tool 16 are also movable longitudinally of the slot 7, it follows that the guides and the sharpening tool may be adjusted so that the distance between the guides may be varied or the distance between the sharpening tool and either of the guides may be changed in order that the guides may engage appropriate stationary guiding members on the lawn mower and the sharpening tool may be caused to contact with any one of the blades of a lawn mower so that by movement of the said sharpening device transversely of the lawn mower, the sharpening tool may operate on the blades.

In adjusting the sharpening device, the guiding member 18 is adjusted so that it will fit the rod 19 whereas the guide 17 is adjusted to fit directly over the edge of the knife. The blade to be sharpened is then inserted in the block under the file or sharpening tool after which the sharpening device is moved from end to end of the blades. If it is found that the blade is not sufficiently sharpened by the operation just indicated, the threaded shank of the guide 17 or 18 according to the position of the beveled surface of the knife is moved a little higher up and the operation is continued until the blade is provided with the required edge. The first operation described is usually sufficient to produce the required cutting edge on the blade and in most instances the readjustment of the guide will be unnecessary.

I claim—

1. In a sharpener for lawn mowers, a body portion having a longitudinally disposed slot, said body portion terminating in handles, guides having threaded shanks adjustable longitudinally of the said body and vertically thereof, and a clamp for a sharpening tool adjustably secured between the walls of the slot.

2. In a sharpener for lawn mowers, a body having a longitudinally disposed slot, guides having threaded shanks extending transversely through the said slot, means for clamping the shanks at different positions of adjustment with relation to the body, a clamp for a sharpening tool comprising a block movable in the slot, said block having a transversely disposed recess forming shoulders, a sharpening tool clamped between the shoulders and the body, and means for operating the clamp for retaining the sharpening tool therein.

3. In a sharpener for lawn mowers, a body, a file supporting member carried by the body portion, a shank carried by the file supporting member, and means coöperating with the shank for adjustably securing the file supporting member in positions of adjustment, and at the same time holding the file into engagement with the body portion.

In testimony whereof, I affix my signature in the presence of two witnesses.

NICHOLAS SPECK.

Witnesses:
 F. E. CORSON,
 M. J. KNIGHT.